United States Patent [19]

Tezuka et al.

[11] 4,319,822
[45] Mar. 16, 1982

[54] ELECTROMAGNETICALLY OPERATED SHUTTER

[75] Inventors: Nobuo Tezuka, Tokyo; Michio Hirohata, Inagi, both of Japan

[73] Assignee: Canon Kabushiki Kaisha, Tokyo, Japan

[21] Appl. No.: 195,852

[22] Filed: Oct. 10, 1980

[30] Foreign Application Priority Data

Oct. 13, 1979 [JP] Japan .......................... 54-141641[U]
Oct. 13, 1979 [JP] Japan .......................... 54-141643[U]

[51] Int. Cl.³ .......................... G03B 9/62; G03B 9/08
[52] U.S. Cl. .................................... 354/234; 354/274
[58] Field of Search ............... 354/270, 272, 273, 274, 354/230, 234, 235

[56] References Cited

U.S. PATENT DOCUMENTS

| | | | |
|---|---|---|---|
| 3,533,345 | 10/1970 | Starp | 354/234 |
| 3,635,141 | 1/1972 | Starp et al. | 354/235 |
| 3,654,845 | 4/1972 | Fahlenberg et al. | 354/234 |

FOREIGN PATENT DOCUMENTS

| | | | |
|---|---|---|---|
| 52-37428 | 3/1977 | Japan | 354/234 |
| 52-41529 | 3/1977 | Japan | 354/274 |

Primary Examiner—Donald A. Griffin
Attorney, Agent, or Firm—Toren, McGeady & Stanger

[57] ABSTRACT

An electromagnetically operated shutter device includes a magnetic body and permanent magnets which form a magnetic circuit in the magnetic body. A positioning member for seating the magnets within the body is made of a non-metallic material, and is formed of a support structure and a frame. A gap is formed by the frame between the positioning member and the magnetic body, and a shutter drive motor is disposed in the gap and is rotatably held by the support structure. According to one embodiment, an adjusting member is arranged on the body for adjusting the extent to which shutter blades driven by the rotor overlap one another. The adjusting member is magnetically shielded by a magnetic path which is formed by a part of the magnetic body.

5 Claims, 3 Drawing Figures

F I G.2
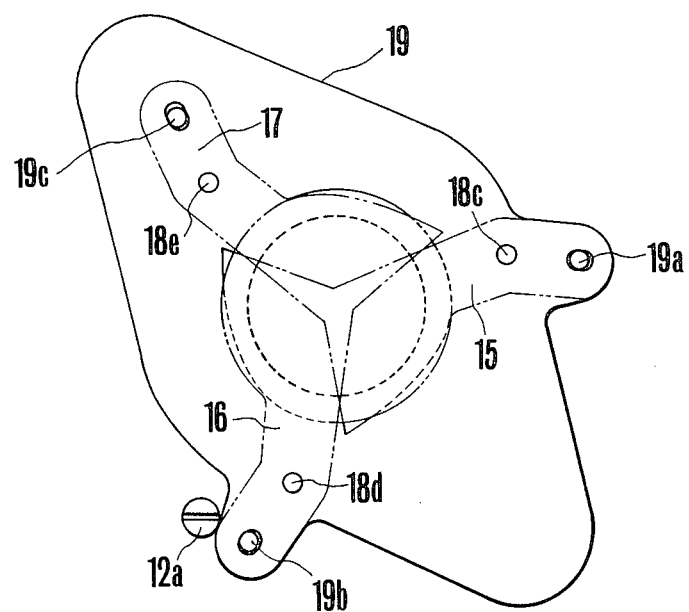

4,319,822

ELECTROMAGNETICALLY OPERATED SHUTTER

BACKGROUND OF THE INVENTION

1. Field of the Invention

This invention relates to an improvement in the structural arrangement of an electromagnetically operated shutter for a camera.

2. Description of the Prior Art

Generally, an electromagnetically operated shutter uses an electromagnetic force for driving shutter blades. The electromagnetic force F is expressed as $F=BIL$ and is proportional to magnetic flux density (B), a current (I) and coil length (L) respectively. In order that every electromagnetically operated shutter to be manufactured have a uniform driving force, therefore, the magnetic flux density, the current and the coil length must be kept in an unvaried condition. As for the coil length, it is possible to wind or pattern a coil to an undeviating uniform length so that coils of uniform length can be always obtained. It is also possible to obtain an undeviating value of current through an electric circuit. However, it has been impossible to obtain a uniform degree of magnetic flux density for every shutter manufactured because of a problem relative to positioning a permanent magnet. In other words, in the conventional electromagnetically operated shutter, a permanent magnet is arranged without placing it in a fixed position on a magnetic base plate used for forming a magnetic circuit. Therefore, the permanent magnet and the coil of one shutter have differed in position from those of another shutter. Besides, a spacer or the like inserted in a space between the permanent magnet and a yoke to form "a gap of a magnetic circuit" has made it difficult to attain dimensional precision. This difficulty has furthered the unevenness of shutters in respect to magnetic flux density and also has complicated assembling work.

Further, to better the dynamic characteristic of a shutter, it is advantageous to have a greater driving force. In view of this, a uniform high magnetic flux density has been obtained in practice by using a stronger permanent magnet. The use of a strong permanent magnet, however, presents a problem in that the magnetic flux might leak to some parts outside of the magnetic circuit. Such a magnetic flux leakage tends to magnetically affect other parts of the camera such as a shutter control circuit, and thus tends to cause troubles in shutter control, etc.

The degree of overlapping of shutter blades hardly can be made uniform among shutters due to manufacturing errors, etc. Then, the uneven overlapping of shutter blades makes the dynamic characteristic, in the initial stage of movement, of one shutter different from that of another. This results in an exposure error. It is, therefore, necessary to have the overlapping of the shutter blades adjusted to a uniform degree by means of an adjusting member. Then, with such an adjusting member used for an electromagnetically operated shutter of the above stated type, it is necessary to have the adjusting member disposed on the base plate which forms a magnetic circuit. The adjusting member is to be adjusted with some tool such as a screw driver upon completion of shutter assembly. If the adjusting tool is made of a magnetic material, there would take place an attraction between the tool and the base plate which forms the magnetic circuit. The attraction would hinder the adjusting work. Then, if the work must be done with a tool made of a non-magnetic material, it necessitates selection of such a tool solely for the adjusting work on this part while other parts of a camera are assembled and adjusted with tools made of a magnetic material. This complicates the work. Further, even if a tool made of any material is used as desired, magnetic dust sticking to the tool would still be attracted to the base plate around the adjusting member during the adjusting work thereon, and then might remain there after adjustment to hinder the rotation of the rotor or the movement of the shutter blades.

SUMMARY OF THE INVENTION

It is an object of the invention to provide an electromagnetically operated shutter device which eliminates the above stated shortcomings of the conventional shutters, including a magnetic body, permanent magnets for providing a magnetic circuit within the magnetic body, and a positioning member which is arranged to position the permanent magnets within the magnetic body. A frame is formed to surround the positioning member, and a shutter driving rotor is disposed in a gap formed between the frame of the positioning member and a part of the magnetic body. Accordingly, positioning of the permanent magnets, and forming a gap in the magnetic circuit are accomplished simultaneously.

It is another object of the invention to provide an electromagnetically operated shutter device including a magnetic piece on the magnetic body to form a magnetic path, and an adjusting member for adjustment of the extent to which shutter members or blades overlap, wherein the adjusting member is magnetically shielded by the magnetic path formed with the magnetic piece.

These and further objects, features and advantages of the invention will become apparent from the following detailed description of an embodiment thereof taken in connection with the accompanying drawing.

BRIEF DESCRIPTION OF THE DRAWINGS

FIG. 2 is a detail view of a rotor and shutter blades shown in FIG. 1.

DESCRIPTION OF THE PREFERRED EMBODIMENT

Figure 1:
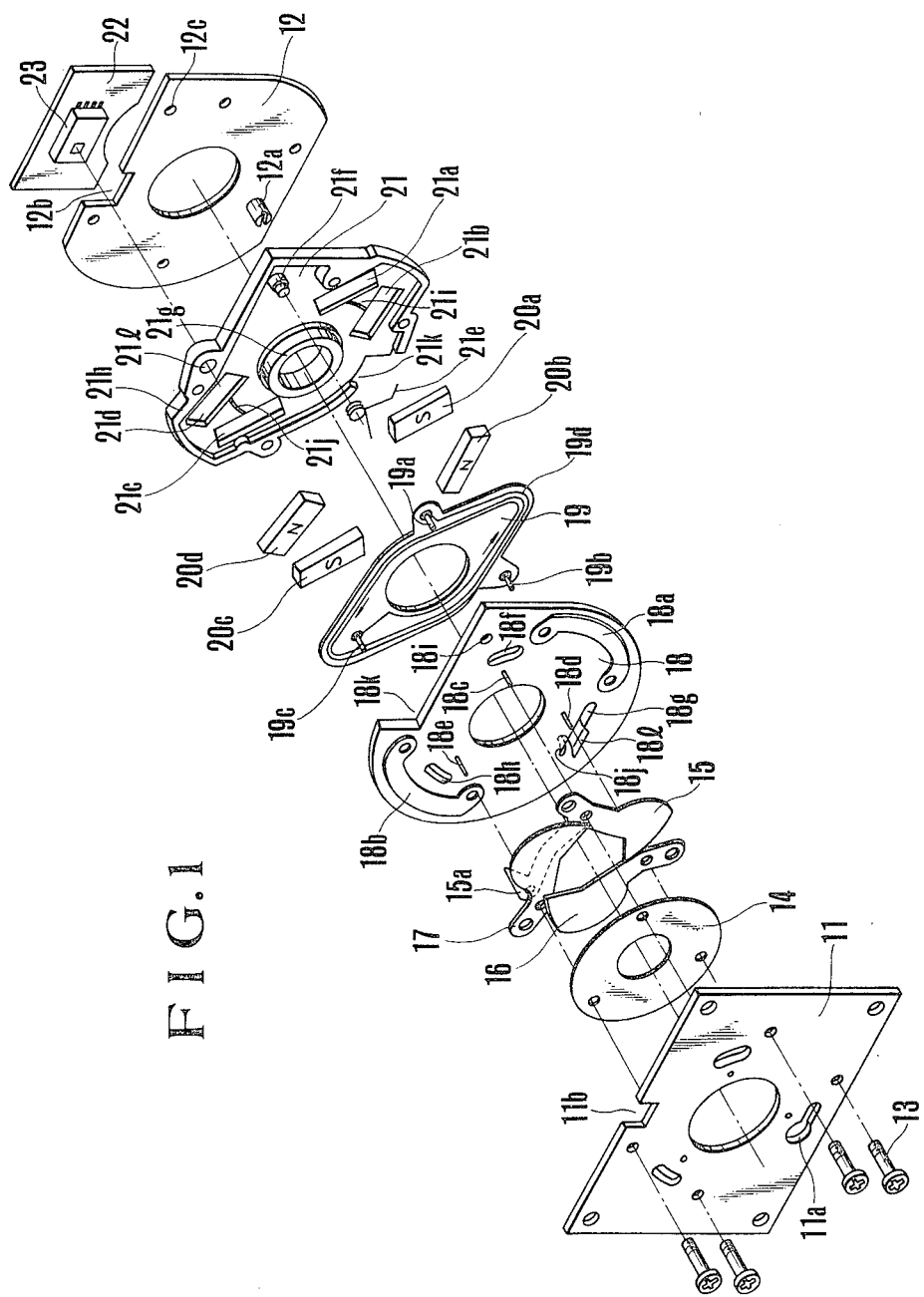
FIG. 1 is an exploded view showing an electromagnetically operated shutter as an embodiment of the present invention.
Figure 3:
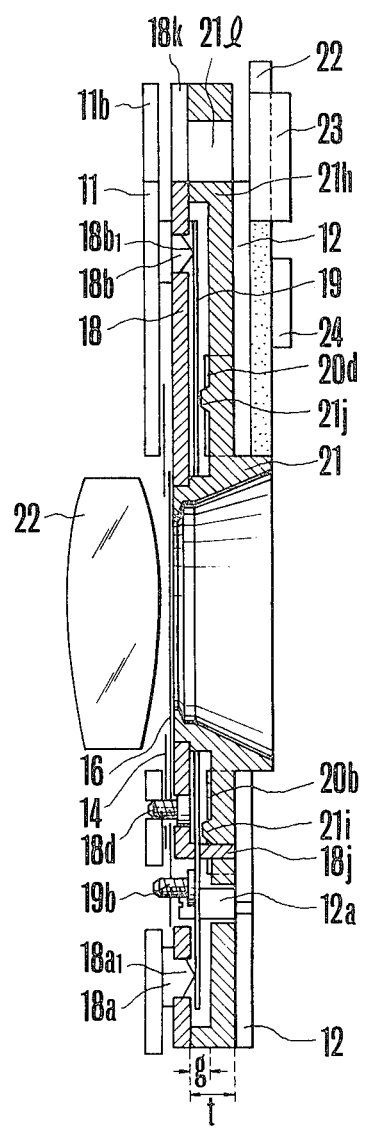
FIG. 3 is a sectional view showing the assembly of the shutter shown in FIG. 1.

In the embodiment of the present electromagnetically operated shutter device shown in FIG. 1, which is an exploded view showing the essential components of the embodiment, a first base plate 11 is attached to a camera body (not shown). A second base plate 12 is made of a magnetic material. The first and second base plates 11 and 12 are mounted with screws 13. Between the first and second base plates 11 and 12, there are provided a shutter opening restricting member 14; three shutter blades 15, 16 and 17 which are made of a synthetic resin; a guide plate 18 which is made of a magnetic material; a rotor 19; permanent magnets 20a, 20b, 20c and 20d; and a positioning member 21 which is made of a non-magnetic material such as a plastics material. Each of the first base plate 11, the restricting member 14, the guide plate 18, the rotor 19, the positioning member 21 and the second base plate 12 is provided with an opening for allowing light to pass therethrough. Meanwhile, there is provided a shutter blade assembly which consists of the three shutter blades 15, 16 and 17 and is arranged to block the passage of the light. These shutter blades 15, 16 and 17 are disposed between the first base plate 11 and the guide plate 18 together with the restricting member 14. The guide plate 18 is provided with spacers 18a and 18b which define a movable space for these blades. Around the opening of the guide plate 18, there extend pins 18c, 18d and 18e which serve as rotation shafts for the shutter blades. These pins 18c, 18d and 18e are arranged to pierce through the shutter blades and the restricting member 14 and are inserted into holes provided in the first base plate 11. In the guide plate 18, there are provided guide slots 18f, 18g and 18h which are arranged to have pins 19a, 19b and 19c extending from the rotor 19 inserted therein. The pins 19a, 19b and 19c extending from the rotor 19 are arranged to serve as driving shafts for driving the shutter blades 15, 16 and 17. The rotor 19 is provided with a coil 19d. The positioning member 21 is provided with holes 21a, 21b, 21c and 21d for inserting therein the permanent magnets 20a, 20b, 20c and 20d which are magnetized in the direction of thickness of the plate; a spring retainer 21f for a spring 21e which is arranged to urge the rotor to rotate clockwise; a support 21g for supporting the rotor 19; and a surrounding frame 21h which is formed into one unified body with the positioning member 21. The spring retainer 21f is arranged to serve also as a positioning pin and to protrude not only on the forward surface of the positioning member 21 but also protrude from the reverse side thereof. The spring retainer 21f is thus inserted into a hole 18i of the guide plate 18 and also into a hole 12c provided in the second base plate 12. As shown in FIG. 3, the frame 21h has a total thickness t and forms a gap of width g between the positioning member 21 and the guide plate 18. With this gap provided by the frame 21h between the guide plate 18 and the positioning member 21, dust is effectively prevented from entering into the shutter. Further, on the reverse sides of the positioning member 21 and the spacers 18a and 18b, there are provided protrusions 21i, 21j, 18a1 and 18b1 which permit the rotor 19 to rotate without coming into contact directly with the magnets 20a, 20b, 20c and 20d and the guide plate 18. The support 21g is arranged into two steps for insertion into the openings provided in the rotor 19 and the guide plate 18, while the support 21g is also arranged to be inserted into the second base plate on the reverse side of the positioning member 21.

On the second base plate 12, there is provided an eccentric pin 12a which is arranged to serve as an adjusting member for adjustment of the extent to which the shutter blades 15, 16 and 17 overlap each other. This eccentric pin 12a is positioned in the cutaway part 21k of the positioning member 21 and an adjusting hole 18l of the guide plate 18 communicating with the guide slot 18g while the pin 12a is in contact with the rotor 19 as shown in FIG. 2. In FIG. 2, the illustration omits an auxiliary stop 15a (FIG. 1). The eccentric pin 12a is arranged to be adjusted by inserting a tool such as a screw driver through an adjusting hole provided in the first base plate 11. A bent piece 18j is taken out from a part of the guide plate 18 around the adjusting hole 18l provided therein. This bent piece 18j is arranged to abut on the second base plate 12 through the cutaway part 21k as shown in FIG. 3. This bent piece 18j is provided for the purpose of eliminating any magnetic effect on the eccentric pin 12a. With the bent piece 18j arranged in this manner, a magnetic path is formed between the guide plate 18 and the second base plate 12 to magnetically shield the eccentric pin 12a. There is provided a printed circuit board 22 which has a light sensitive element 23 disposed thereon. The light sensitive element 23 is arranged to have light guided thereto through the cutaway part 11b of the first base plate 11, the auxiliary stop 15a, the cutaway part 18k of the guide plate 18, the window 21l provided in the positioning member 21 and the cutaway part 12b of the second base plate 12. The auxiliary stop 15a is provided in one end part of the shutter blade 15 and is arranged to control the quantity of the light arriving at the light sensitive element in accordance with the action of the adjoining shutter blade 17. On the reverse side of the printed circuit board 22, there is provided a shutter control circuit element 24 as shown in FIG. 3. This circuit element 24 is located on the reverse side of the second base plate 12 to avoid a magnetic effect on the circuit element. In FIG. 3, there is shown only one shutter blade, while other shutter blades are omitted from the illustration.

In manufacturing the shutter, the permanent magnets 20a, 20b, 20c and 20d are inserted in the holes 21a, 21b, 21c and 21d of the positioning member 21. The spring 21e is engaged with the spring retainer 21f. The opening of the rotor 19 is fitted onto the first step of the support 21g. Then, the spring 21e is applied to the rotor 19 to bring it into a state of being turned clockwise. The spring retainer 21f is then inserted into the hole 18i of the guide plate 18 to effect positioning. Then, the opening of the guide plate 18 is fitted onto the second step of the support 21g in such a way as to have the pins 19a, 19b and 19c inserted into the guide slots 18f, 18g and 18h of the guide plate 18. The second base plate 12 is fitted onto the protrusion of the spring retainer 21f protruding on the reverse side of the positioning member 21 for positioning. Following this, the shutter blades 15, 16 and 17 are placed on the pins 18c, 18d, 18e, 19a, 19b and 19c and then the restricting member 14 is fitted onto the pins 18c, 18d and 18e. Last, the pins 18c, 18d, 18e, 19a, 19b and 19c are inserted into the corresponding holes of the first base plate 11. Then the first and second base plates 11 and 12 are fixed to each other by screws. The shutter assembled in this manner is shown in FIG. 3.

During the manufacture of the shutter, positioning of the permanent magnets is effected by inserting the permanent magnets 20a, 20b, 20c and 20d into the holes 21a, 21b, 21c and 21d of the positioning member 21, so that the permanent magnets can be set in a predetermined position without deviation. The rotor 19 is positioned with its opening fitted onto the first step part of the support 21g and is kept in this position with the guide plate 18 mounted. Therefore, the coil 19d of the rotor 19 and the permanent magnets 20a, 20b, 20c and 20d are kept in a stable positional relation to each other. Further, the gap between the guide plate 18 and the permanent magnets 20a, 20b, 20c and 20d is kept unvaried by the frame 21h, so that the magnetic flux density of the shutter can be uniformly arranged with the gap of the magnetic circuit always maintained constant. Further, since the space between the positioning member 21 and the guide plate 18 is arranged to be encased, dust is effectively prevented from entering there. The holes for positioning the permanent magnets, the support for the rotor 19 and the frame for forming the gap g are arranged into one unified body to form the positioning member to ensure dimensional precision in the manufacture of the shutter.

The electromagnetically operated shutter which is represented by the exploded view in FIG. 1 is assembled as shown in FIG. 3. Then, since the bent piece 18j of the guide plate 18 is abutting the second base plate 12, there is formed a magnetic path between the guide plate 18 and the second base plate 12 to magnetically shield the eccentric pin 12a. This arrangement eliminates the magnetic effects of the guide plate 18 and the base plate 12 in the vicinity of the eccentric pin 12a, so that magnetic dust sticking to a tool can be prevented from being attracted by the guide plate 18 and the second base plate 12 in the vicinity of the eccentric pin 12a. Even if a tool made of a magnetic material is used, the tool will never be attracted so that adjusting work can be easily accomplished. The extent to which the shutter blades are arranged to overlap each other is adjusted by turning the eccentric pin 12a to adjust the starting position of the rotor 19. Since the shutter control circuit element 24 is disposed on the reverse side of the second base plate 12 which forms a magnetic circuit, the circuit element 24 is free from any magnetic influence.

With the shutter in a closed state, when a current is allowed to flow to the coil 19d in the direction of the arrows shown in FIG. 1, there is generated an electromagnetic force in accordance with Fleming's left-hand rule. Then, the rotor 19 rotates counterclockwise against the pressure of the spring 21e to open the shutter blades 15, 16 and 17. Then, since the outer circumference of the shutter blades 15, 16 and 17 is larger than the diameter of aperture 14d for the light flux, the shutter blades 15, 16 and 17 open without colliding against the aperture 14d. Further, at this time, the rotor 19 begins to rotate from a position at which it has been adjusted by the eccentric pin 12a. Therefore, the dynamic characteristic of the movement of the shutter blades is unvarying. With the shutter blades 15, 16 and 17 opened in this manner, there is effected an exposure. Then, the power supply to the coil 19d of the rotor 19 is cut off after a length of time determined by the shutter control circuit element 24 in accordance with the output of the light sensitive element 23. The electromagnetic force generated at the coil 19d then decays. The rotor 19 is rotated clockwise by the spring 21 to close the shutter blades.

In accordance with the invention, since the positioning member is formed into one unified body as mentioned in the foregoing, the dimensional precision of shutters can be made uniform. Magnetic flux density can be stabilized and shutter assembly can be facilitated. The rotor is encased with the positioning member and the guide plate, so that dust can be effectively prevented from entering there. The rotor which is disposed for movement within a working space has few parts that might come into contact with other parts. Therefore, it has little friction to enhance the kinetic characteristic of the shutter.

Between the first and second magnetic plates which form a magnetic circuit with permanent magnets for rotating the shutter driving rotor, there is provided a magnetic piece to form a magnetic path. This magnetic path is used to magnetically shield the adjusting member which is provided for adjustment of the extent to which the shutter blades are allowed to overlap each other. Therefore, when the adjusting member is adjusted by a tool, magnetic dust sticking to the tool is never attracted to the first and second magnetic plates in the vicinity of the adjusting member. Even if the tool is made of a magnetic material, the tool would not be attracted, so that the shutter assembling operation can be accomplished without difficulty. Further, since the shutter control circuit is disposed behind the magnetic plate, the circuit is magnetically shielded to allow it to perform shutter control with a high degree of accuracy.

What is claimed is:

1. An electromagnetically operated shutter for a camera comprising:
   a magnetic body having a magnetic circuit formed therein;
   a permanent magnet for forming the magnetic circuit in said magnetic body;
   a positioning member of a non-magnetic material and having a fitting part for seating said permanent magnet therein, said positioning member having a frame and a support portion; and
   a shutter driving rotor disposed between said magnetic body and said positioning member, said gap being formed by said frame, said rotor being rotatably carried by said support portion of said positioning member.

2. An electromagnetically operated shutter according to claim 1 wherein said shutter driving rotor is encased by said magnetic body, said positioning member and said frame of the positioning member.

3. An electromagnetically operated shutter for a camera comprising:
   first and second magnetic bodies forming a magnetic circuit therein;
   a plurality of permanent magnets arranged to form said magnetic circuit in said first and second magnetic bodies;
   a positioning member of a non-magnetic material interposed in between said first and said second magnetic bodies, said positioning member having a support part and a frame and defining fitting portions, said plurality of permanent magnets being fitted in a plurality of the fitting parts; and
   a shutter driving rotor disposed in a gap between one of said first and second magnetic bodies and said positioning member, said rotor being rotatably carried by said support part of said positioning member, said frame of the positioning member being arranged to form a gap to permit said rotor to move within the gap.

4. An electromagnetically operated shutter according to claim 3, wherein said shutter driving rotor being equipped with a conductor coil, power supply to said conductor coil being controlled by a shutter control circuit element, disposed behind one of said first and second magnetic bodies.

5. An electromagnetically operated shutter for a camera comprising:
   first and second magnetic bodies having a magnetic circuit formed therein;
   permanent magnets arranged to form said magnetic circuit in said first and second magnetic bodies;
   a positioning member which is made of a non-magnetic material and is provided with a fitting part for having said permanent magnets fitted therein, said positioning member being provided also with a frame;
   a shutter driving rotor disposed in a gap between one of said first and second magnetic bodies and said positioning member, said gap being formed by said frame;

an adjusting member provided on one of said first and second magnetic bodies, said adjusting member being arranged to adjust the extent to which shutter members overlap each other; and
a magnetic piece interposed in between said first and second magnetic bodies, said magnetic piece being arranged to form a magnetic path between the first and second magnetic bodies for magnetically shielding said adjusting member thereby.

* * * * *